United States Patent
Yamaoka et al.

(10) Patent No.: US 12,220,806 B2
(45) Date of Patent: Feb. 11, 2025

(54) DEBURRING DEVICE AND CONTROL SYSTEM

(71) Applicant: FANUC CORPORATION, Yamanashi (JP)

(72) Inventors: Nobuaki Yamaoka, Yamanashi (JP); Yihua Gu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 309 days.

(21) Appl. No.: 17/798,731

(22) PCT Filed: Feb. 15, 2021

(86) PCT No.: PCT/JP2021/005486
§ 371 (c)(1),
(2) Date: Aug. 10, 2022

(87) PCT Pub. No.: WO2021/166842
PCT Pub. Date: Aug. 26, 2021

(65) Prior Publication Data
US 2023/0083001 A1 Mar. 16, 2023

(30) Foreign Application Priority Data
Feb. 21, 2020 (JP) ................................ 2020-027935

(51) Int. Cl.
*B25J 11/00* (2006.01)
*B25J 9/16* (2006.01)

(52) U.S. Cl.
CPC ........... *B25J 11/006* (2013.01); *B25J 9/1633* (2013.01); *B25J 9/1664* (2013.01)

(58) Field of Classification Search
None
See application file for complete search history.

(56) References Cited

U.S. PATENT DOCUMENTS

2006/0149421 A1* 7/2006 Akiyama ............... B25J 9/1664
700/245
2015/0005923 A1* 1/2015 Gu ...................... B24B 27/0038
901/41
(Continued)

FOREIGN PATENT DOCUMENTS

DE 10 2017 102 260 8/2017
DE 10 2017 128 757 6/2018
(Continued)

OTHER PUBLICATIONS

International Search Report issued Mar. 30, 2021 in corresponding International Application No. PCT/JP2021/005486.

*Primary Examiner* — Jonathan L Sample
*Assistant Examiner* — Alan Lindsay Ostrow
(74) *Attorney, Agent, or Firm* — Wenderoth, Lind & Ponack, L.L.P.

(57) ABSTRACT

A deburring device includes a robot program creating unit that creates a program from data of an object, a deburring part detecting unit that detects a position for a deburring part on the object, and a robot program updating unit that updates the program by the detected position of the deburring part. The deburring device also includes a force control unit that controls to yield a predetermined pressing force, an actual path acquiring unit that acquires an actual path of a robot when controlled at the predetermined pressing force by the updated program, and a path correction parameter calculating unit that calculates a correction parameter for the position for the deburring part on the object from the path of the robot from the visual sensor and the actual path.

5 Claims, 7 Drawing Sheets

(56) References Cited

U.S. PATENT DOCUMENTS

| | | | | |
|---|---|---|---|---|
| 2015/0352716 | A1* | 12/2015 | Sonehara | B25J 9/1633 |
| | | | | 901/10 |
| 2016/0089789 | A1* | 3/2016 | Sato | B25J 13/088 |
| | | | | 700/254 |
| 2016/0243664 | A1* | 8/2016 | Nagata | B23Q 17/249 |
| 2017/0129066 | A1* | 5/2017 | Okuda | B24B 49/12 |
| 2020/0290207 | A1* | 9/2020 | Wang | B25J 9/1684 |

FOREIGN PATENT DOCUMENTS

| | | |
|---|---|---|
| DE | 10 2015 000 587 | 9/2018 |
| DE | 10 2018 004 522 | 12/2018 |
| DE | 11 2010 000 794 | 4/2019 |
| JP | 2010-182210 | 8/2010 |
| JP | 2015-134407 | 7/2015 |
| JP | 5845212 | 1/2016 |
| JP | 2016-140958 | 8/2016 |
| JP | 2019-209444 | 12/2019 |

* cited by examiner

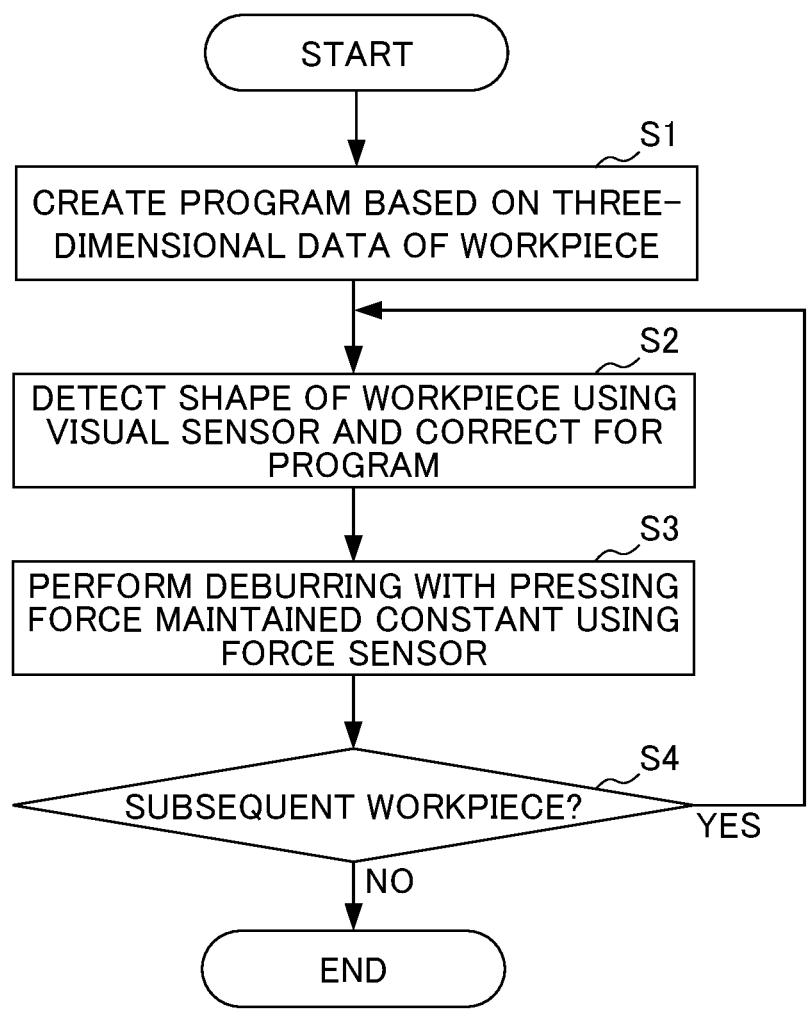

DEBURRING DEVICE AND CONTROL SYSTEM

TECHNICAL FIELD

The present invention relates to a deburring device and a control system.

BACKGROUND ART

In a post-machining deburring process that is performed by a robot according to a known technique: (1) a device creates a robot program by acquiring the shape of a burr portion and the posture of a tool of the robot based on three-dimensional data of a workpiece offline; (2) the device detects the shape of the workpiece using a camera (hereinafter, also referred to as "visual sensor") and updates the robot program based on the detection result; and (3) the device executes the robot program, detects force acting on the workpiece using a force sensor attached to a wrist of the robot, and performs deburring while performing force control so that the detected value of the force is maintained at a target value. See, for example, Patent Document 1.

Patent Document 1 Japanese Patent No. 5845212

DISCLOSURE OF THE INVENTION

Problems to be Solved by the Invention

As described above, a conventional deburring device performs a deburring process as shown in FIG. 7.

That is, as described above, the deburring device preliminarily creates a program based on three-dimensional data of a workpiece offline at Step S1. Note that one program is created per type of workpiece.

At Step S2, the deburring device detects the workpiece one at a time using a visual sensor and based on the detection result, corrects for a position that is taught by the program created at Step S1.

At Step S3, the deburring device performs deburring while performing force control using a force sensor, and thus maintaining a constant pressing force.

At Step S4, the deburring device determines whether or not there is a subsequent workpiece. The process returns to Step S1 if there is a subsequent workpiece, and the process ends if there is no subsequent workpiece.

The deburring process as shown in FIG. 7 makes it possible to stabilize the deburring quality even if workpiece positions and burr shapes vary, because the correction is carried out on a per-workpiece basis using the camera and the force sensor.

However, the deburring process shown in FIG. 7 can be sometimes insufficient to stabilize the deburring quality. For example, a certain magnitude of detection error of the visual sensor or a certain operation speed for the deburring makes it impossible to completely correct for the error using the force sensor. In such a case, the deburring device can press the workpiece with an overly strong force or can fail to make contact with the workpiece, resulting in a decrease in the deburring quality.

In general, parameters of a mechanical unit of a robot (hereinafter, also referred to as "mechanism parameters") are set to values that averagely reduce positional errors throughout the entire working envelope of the robot. However, such parameters can be insufficient in terms of the accuracy for deburring. The accuracy of the mechanical unit of the robot affects not only the accuracy of a machining operation but also the accuracy of calibration of the mechanical unit of the robot and the visual sensor relative to one another (relative position setting).

Possible solutions to reduce an error are by reducing the range of the detection by the visual sensor and detecting a plurality of locations therein, or by performing the calibration in a plurality of areas. However, these solutions increase the production cycle time and require more user effort at the time of start-up.

It is therefore desirable to easily correct for a detection error of the visual sensor and an error of the mechanical unit of the robot.

Means for Solving the Problems (1) An aspect of the present disclosure is directed to a deburring device including: a deburring robot manipulator configured to remove a burr from an object; a robot program creation unit configured to preliminarily create a robot program for deburring; a burr portion detection unit configured to detect a position of a burr portion of one workpiece using a visual sensor, the one workpiece being the object; a robot program update unit configured to update the robot program based on the position of the burr portion of the one workpiece, the position having been detected by the burr portion detection unit; a force control unit configured to detect force acting on the robot manipulator and the one workpiece, and control the detected force to a predetermined value of pressing force; a true path acquisition unit configured to acquire a true path of a movement of the robot manipulator while the detected force is controlled to the predetermined value of pressing force by the force control unit based on the robot program updated by the robot program update unit; and a path correction parameter calculation unit configured to calculate correction parameters related to the position of the burr portion of the one workpiece detected by the burr portion detection unit, based on a difference between the true path and a path of a movement of the robot manipulator detected using the visual sensor while the detected force is controlled to the predetermined value of pressing force by the force control unit, wherein the robot program update unit further corrects for a position of a burr portion of a subsequent workpiece being the object detected by the burr portion detection unit using the correction parameters calculated by the path correction parameter calculation unit are used to correct, and updates the robot program based on the corrected position of the burr portion, and the force control unit further detects force acting on the robot manipulator and the subsequent workpiece, and controls the detected force to the predetermined value of pressing force based on the robot program updated by the robot program update unit.

(2) Another aspect of the present disclosure is directed to a control system including: a robot configured to machine an object; a creation unit configured to preliminarily create an operation program for operation of the robot; a detection unit configured to detect one workpiece using a visual sensor, the one workpiece being the object; an update unit configured to update the operation program based on a result of detection of the one workpiece detected by the detection unit; a control unit configured to control a machining operation of the robot on the one workpiece based on the operation program updated by the update unit; an acquisition unit configured to acquire a true path of the machining operation of the robot while the machining operation is controlled by the control unit based on the operation program updated by the update unit; and a calculation unit configured to calculate correction parameters related to the result of the detection of the one workpiece detected by the detection unit, based on the true path and a path of the machining operation of the robot detected by the detection unit while the machining operation is controlled by the control unit, wherein the update unit further corrects for a result of detection of a subsequent workpiece being the object detected by the detection unit using the correction parameters calculated by the calculation unit are used to correct, and updates the operation program based on the corrected result of the detection, and the control unit further controls the machining operation of the robot on the subsequent workpiece based on the operation program updated by the update unit.

Effects of the Invention

According to an aspect, it is possible to easily correct for a detection error of a visual sensor and an error of a mechanical unit of a robot.

BRIEF DESCRIPTION OF THE DRAWINGS

FIG. 7 is a flowchart for describing a deburring process of a conventional deburring device.

PREFERRED MODE FOR CARRYING OUT THE INVENTION

The following describes an embodiment with reference to the drawings.

Embodiment

Figure 1:
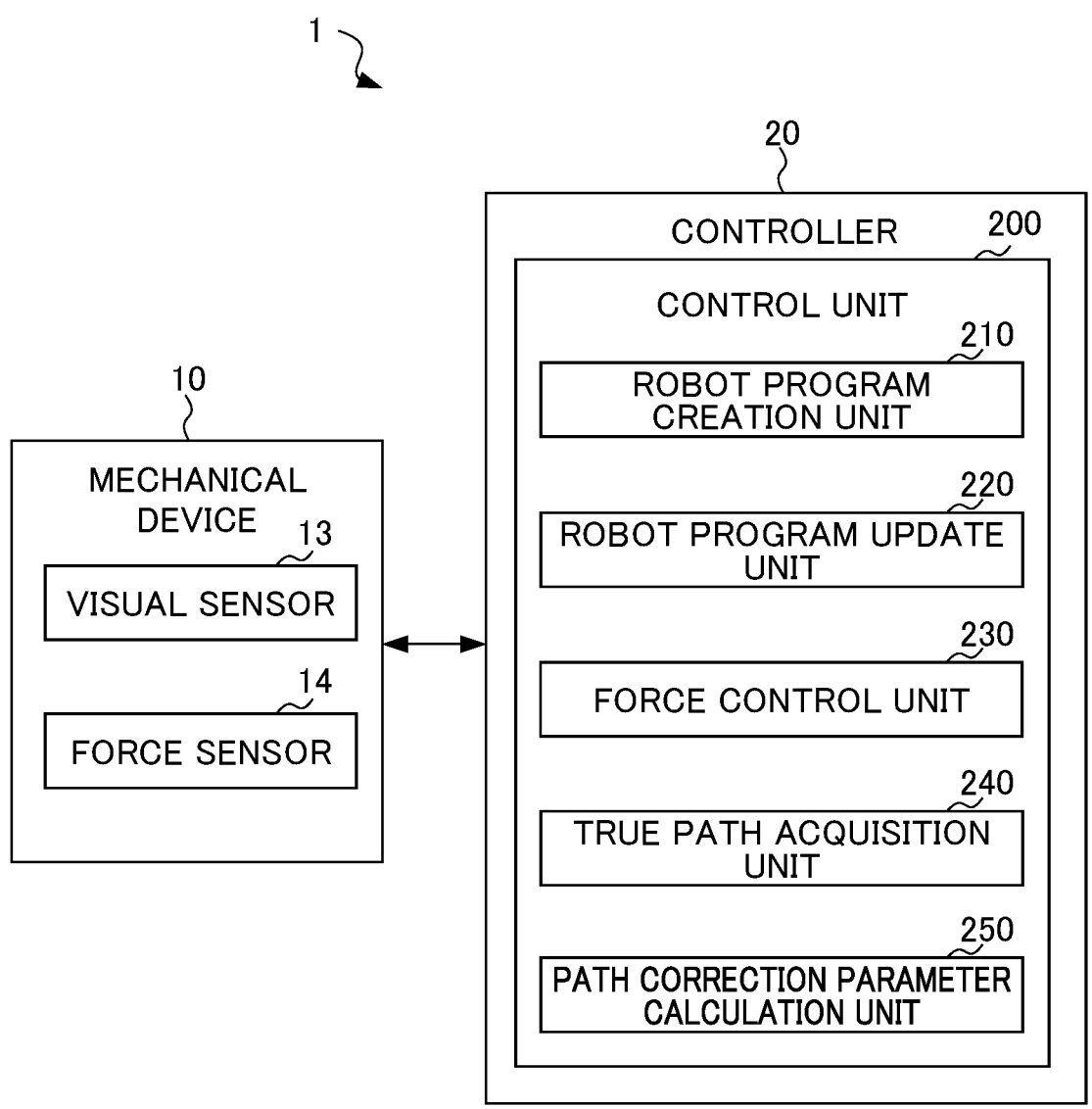
FIG. 1 is a functional block diagram showing an example of a functional configuration of a deburring device according to an embodiment.

FIG. 1 is a functional block diagram showing an example of a functional configuration of a deburring device according to an embodiment. As shown in FIG. 1, a deburring device 1 includes a mechanical device 10 and a controller 20. Hereinafter, the mechanical device 10 is described as an example of a robot, and the controller 20 is described as an example of a robot controller. However, the present disclosure is not limited as such.

The mechanical device 10 and the controller 20 may be directly connected to one another through a connection interface, not shown. Alternatively, the mechanical device 10 and the controller 20 may be connected to one another via a network such as a local area network (LAN). In this case, the mechanical device 10 and the controller 20 may each have a communication unit, not shown, for communicating with one another through such a connection.

The mechanical device 10 is, for example, a machine tool or an industrial robot. In the following, the mechanical device 10 will be described as an industrial robot (hereinafter, also referred to as "robot 10").

Figure 2:
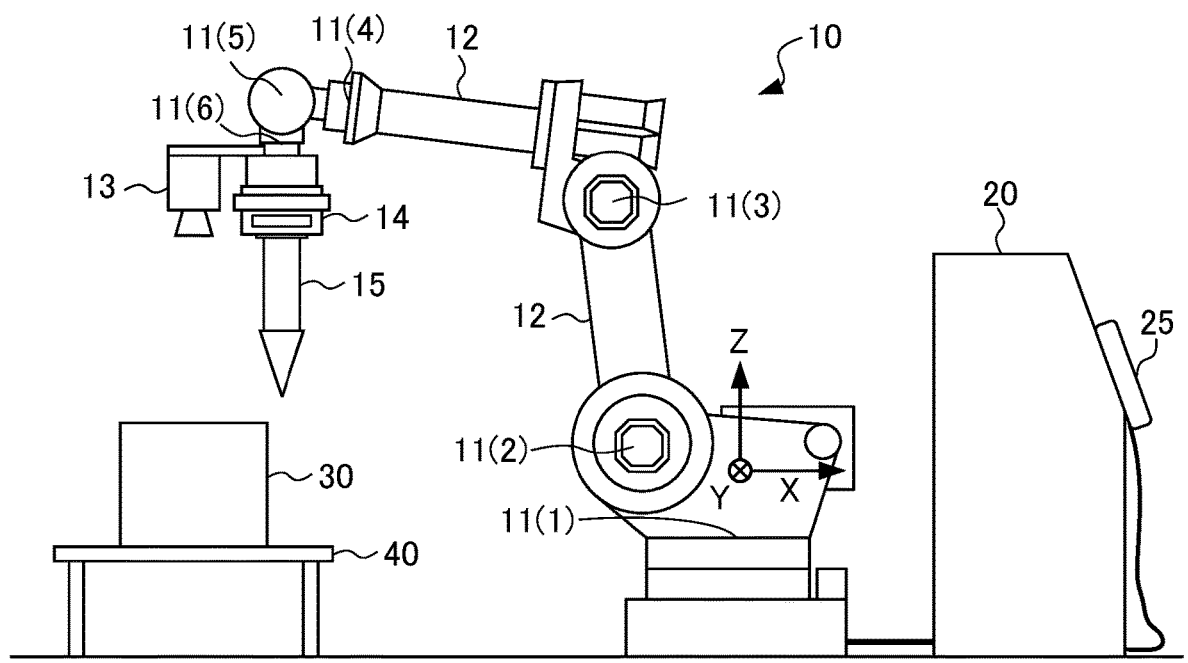
FIG. 2 is a diagram showing an example of a robot.

FIG. 2 is a diagram showing an example of the robot 10.

The robot 10 is, for example, a six-axis vertical articulated robot as shown in FIG. 2. The robot 10 has six joint axes 11(1) to 11(6) and arms 12 connected by the joint axes 11(1) to 11(6). The robot 10 drives, based on a drive command from the controller 20, movable members such as the arms 12 (hereinafter, also referred to as "manipulator") by driving servomotors, not shown, provided in one-to-one correspondence with the joint axes 11(1) to 11(6). A visual sensor 13, a force sensor 14, and a debarring tool (hereinafter, also referred to as "tool") 15, for example, are attached to a distal end of the manipulator of the robot 10, which is, for example, a distal end of the joint axis 11(6).

Although the robot 10 is described as a six-axis vertical articulated robot, the robot 10 may be, for example, a multi-axis vertical articulated robot other than the six-axis vertical articulated robot, a horizontal articulated robot, or a parallel-link robot.

Hereinafter, the joint axes 11(1) to 11(6) may also be collectively referred to as "joint axis (axes) 11", provided that the joint axes 11(1) to 11(6) do not need to be distinguished from one another.

Figure 3:
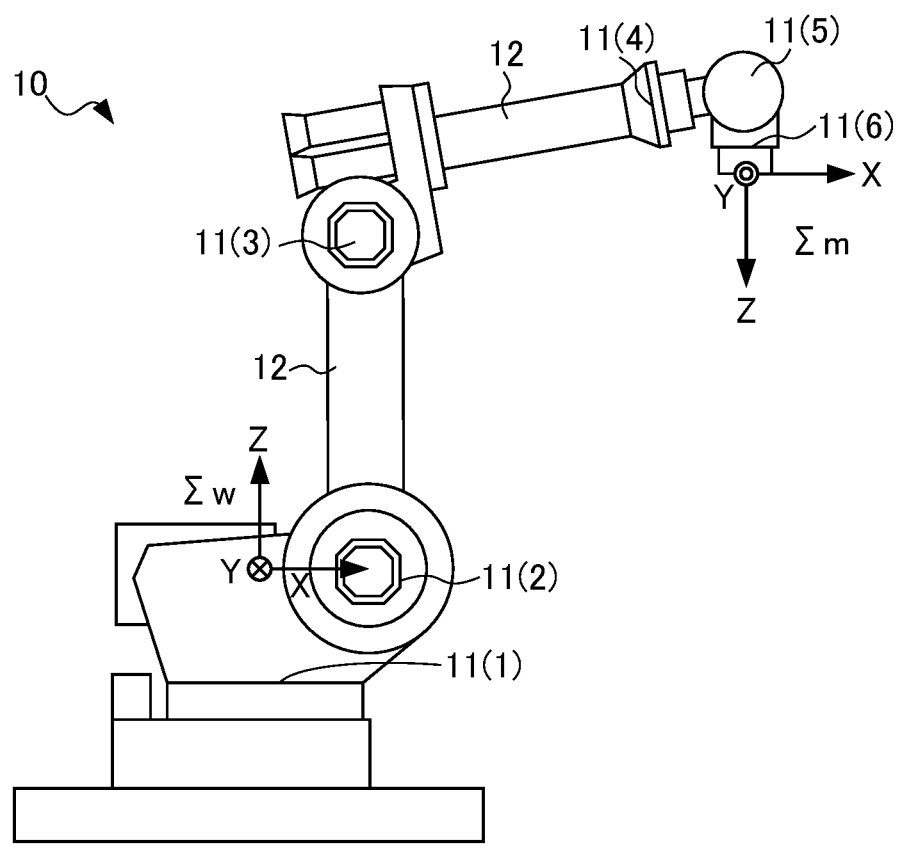
FIG. 3 is a diagram for describing coordinate systems in the robot in FIG. 2.

FIG. 3 is a diagram for describing coordinate systems in the robot 10 in FIG. 2.

As shown in FIG. 3, the robot 10 has a three-dimensional Cartesian world coordinate system $\Sigma w$ fixed in space and a three-dimensional Cartesian mechanical interface coordinate system $\Sigma m$ set on a flange at the distal end of the joint axis 11(6) of the robot 10. In the present embodiment, locations in the world coordinate system $\Sigma m$ and locations in the mechanical interface coordinate system $\Sigma m$ are preliminarily correlated through known calibration. Thus, the controller 20, which will be described below, can control the position of the distal end of the robot 10 having the tool 15 attached thereto, which will be described below, using a location defined according to the world coordinate system $\Sigma w$.

The visual sensor 13 is, for example, a camera and is disposed at the distal end of the manipulator of the robot 10 as shown in FIG. 2. The visual sensor 13 has an image processor, not shown, and thus functions as a burr portion detection unit.

Specifically, the visual sensor 13 detects the position of a certain portion of a workpiece 30, which is a portion remaining as a burr to be removed (hereinafter, also referred to as "burr portion"), by capturing and processing an image of the workpiece 30 placed on a work table 40 for deburring. The visual sensor 13 outputs data indicating the position of the detected burr portion to the controller 20 through the connection interface, not shown.

Note that before detecting the position of the burr portion, the visual sensor 13 may acquire data related to the shape and the position of the burr portion of the workpiece 30 (hereinafter, referred to as "burr portion shape data") from, for example, an offline programming device, not shown. Alternatively or additionally, the visual sensor 13 may detect a characteristic edge line represented by a dark-light boundary on the captured image of the workpiece 30 by a known method such as that disclosed in Patent Document 1, and take an area defined by the characteristic edge line as the burr portion. The visual sensor 13 may be further configured to detect the actual position of the workpiece 30.

The visual sensor 13 may further include a search area limiter (not shown) that limits a search area in the captured image of the workpiece 30 based on the burr portion shape data. This configuration allows the visual sensor 13 to detect the actual position of the burr portion from the limited search area, reducing the time required for the detection of the actual position of the burr portion and ensuring stable detection without the possibility of detecting an irrelevant portion.

Note here that the offline programming device (not shown) described above is a computer device, and may have prestored three-dimensional data of the workpiece 30 and extract, from the three-dimensional data of the workpiece 30, the burr portion shape data related to the shape and the position of the burr portion of the workpiece 30. The offline programming device (not shown) may also set, based on the burr portion shape data, the posture of the tool 15 described below relative to the burr portion for when deburring is performed. The posture of the tool 15 may be set at a constant angle to a surface of the workpiece 30 throughout the entire burr portion or may be set on a location-by-location basis by taking into account external factors such as an obstacle present around the robot 10.

The force sensor 14 is, for example, a six-axis force sensor and is disposed at the distal end of the manipulator of the robot 10. The force sensor 14 detects the pressing force of the tool 15 against the workpiece 30 periodically at predetermined sampling intervals. The force sensor 14 outputs force data indicating the detected pressing force to the controller 20 through the connection interface, not shown.

The servomotors, not shown, of the joint axes 11 have a position sensor (not shown) attached thereto, such as a rotary type encoder, to measure the position and the posture of the distal end of the manipulator. The position sensor (not shown) may output position data indicating the position and the posture measured to the controller 20 through the connection interface, not shown.

The predetermined sampling intervals may be set as appropriate according to, for example, the specific operation of the robot 10 and the environment of the factory where the robot 10 is located.

The tool 15 is, for example, a grinder. The tool 15 is provided on the distal end of the manipulator of the robot 10 and removes a burr from the workpiece 30.

Controller 20

As shown in FIGS. 1 and 2, the controller 20 is a robot control device (also referred to as "robot controller") that outputs a drive command to the robot 10 and controls the operation of the robot 10 based on a program. Note that in FIG. 2, a teaching console 25 for teaching the operation to the robot 10 is connected to the controller 20.

As shown in FIG. 1, the controller 20 according to the present embodiment has a control unit 200. The control unit 200 includes a robot program creation unit 210, a robot program update unit 220, a force control unit 230, a true path acquisition unit 240, and a path correction parameter calculation unit 250.

The control unit 200 has, for example, a central processing unit (CPU), read only memory (ROM), random access memory (RAM), and complementary metal-oxide-semiconductor (CMOS) memory known to those skilled in the art, which are configured to communicate with one another via a bus.

The CPU is a processor that performs overall control of the controller 20. The CPU reads a system program and an application program stored in the ROM via the bus, and performs overall control of the controller 20 in accordance with the system program and the application program. Thus, the control unit 200 is configured to implement functions of the robot program creation unit 210, the robot program update unit 220, the force control unit 230, the true path acquisition unit 240, and the path correction parameter calculation unit 250 as shown in FIG. 1. Various data such as temporary calculation data and display data is stored in the RAM. The CMOS memory is backed up by a battery, not shown, and is configured to serve as nonvolatile memory that retains stored information even when the controller 20 is turned off.

The robot program creation unit 210 creates a robot program for deburring based on three-dimensional data representing the shape of the workpiece 30.

Specifically, the robot program creation unit 210 creates a robot program for the robot 10 based on three-dimensional data of the workpiece 30 including, for example, the burr portion shape data acquired from the offline programming device (not shown) and the posture of the tool 15. Note that one robot program may be created per type of workpiece.

The robot program may specify, for example, a movement path and a movement speed of the tool 15, which in other words is the robot 10, for appropriately performing the deburring. The robot program includes a control signal for the robot 10 and may further include a predetermined value (hereinafter, also referred to as "target value") of pressing force, which is preset to be used for force control of the robot 10 and exerted on the tool 15. The target value of the pressing force may include information on the pressing direction of the pressing force as well as the magnitude of the pressing force.

The robot program update unit 220 updates the robot program created by the robot program creation unit 210. For example, upon the visual sensor 13 detecting the actual position of the burr portion, the robot program update unit 220 updates the robot program so as to change the movement path of the robot 10 based on the detection result.

The robot program update unit 220 may also correct for the position of the burr portion of the workpiece 30 detected by the visual sensor 13 using the correction parameters calculated by the path correction parameter calculation unit 250, which will be described below, for correction of the result of the detection by the visual sensor 13, and update the robot program based on the corrected position of the burr portion.

The force control unit 230 detects, for example, the pressing force of the tool 15 acting on the workpiece 30 using the force sensor 14 attached to the distal end of the robot 10 while the controller 20 is causing the robot 10 to move by executing the robot program updated by the robot program update unit 220. The force control unit 230 performs the force control so that the detected pressing force of the tool 15 is maintained at the target value.

The true path acquisition unit 240 acquires a true path of the movement of the manipulator of the robot 10, which in other words is the tool 15, while the pressing force detected by the force sensor 14 is controlled to the target value by the force control unit 230 based on the robot program updated by the robot program update unit 220.

Specifically, after the workpiece 30 has been detected by the visual sensor 13 and before the deburring is performed using the tool 15 attached to the robot 10, the true path acquisition unit 240 causes the robot 10 to move by executing the updated robot program, and thus runs a simulation on the workpiece 30 at such a speed that the pressing force detected by the force sensor 14 is maintained at the target value (for example, at a lower speed, which is also referred to below as "low speed", than a speed at which the deburring is performed). In this simulation, the robot 10 does not have to perform the deburring.

The true path acquisition unit 240 acquires the path followed by the tool 15 as the true path (hereinafter, also referred to as "low-speed simulation path") based on data outputted by the position sensor of the servomotors, not shown, of the joint axes 11 during the simulation on the workpiece 30 at low speed using the force sensor 14.

The path correction parameter calculation unit 250 calculates correction parameters related to the position of the burr portion of the workpiece 30 detected by the visual sensor 13 based on the difference between the low-speed simulation path obtained using the force sensor 14 and a path (hereinafter, also referred to as "detection path") of the movement of the tool 15 detected by the visual sensor 13 while the pressing force is controlled to the target value by the force control unit 230.

Figure 4:
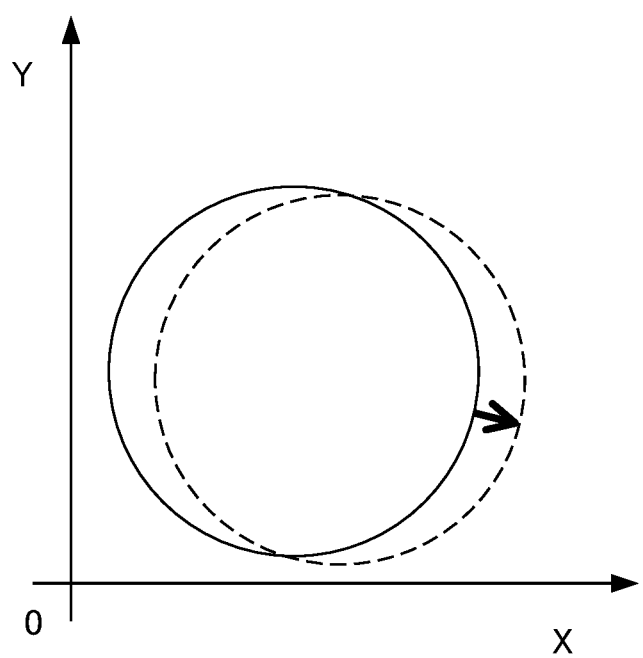
FIG. 4 is a diagram showing an example of a detection path detected by a visual sensor and a low-speed simulation path obtained using a force sensor.

FIG. 4 is a diagram showing an example of the detection path detected by the visual sensor 13 and the low-speed simulation path obtained using the force sensor 14. In FIG. 4, the detection path is represented by a solid line and the low-speed simulation path is represented by a dashed line. The detection path and the low-speed simulation path, which are shown as circular paths in FIG. 4, may be in any shape, and the process and the operation of the path correction parameter calculation unit 250 are the same regardless of the shape. Furthermore, the following describes correction for a parallel movement and an expansion/contraction, but the same description applies to correction for the rotation direction.

As shown in FIG. 4, the detection path detected by the visual sensor 13 is not in conformity to the low-speed simulation path obtained using the force sensor 14. The path correction parameter calculation unit 250 therefore calculates correction parameters that reduce the difference between the two paths to a minimum.

The path correction parameter calculation unit 250 defines a point sequence of the detection path detected by the visual sensor 13 as $(x_{1i}, y_{1i})$ and defines a point sequence of the low-speed simulation path obtained using the force sensor 14 as $(x_{2i}, y_{2i})$, where i is an integer from 1 to n, and n is an integer equal to or greater than 2.

In a case where the path correction parameter calculation unit 250 corrects for the point sequence $(x_{1i}, y_{1i})$ of the detection path detected by the visual sensor 13 to conform the detection path to the low-speed simulation path obtained using the force sensor 14, a point sequence $(x'_{1i}, y'_{1i})$ resulting from the correction is represented by Equation 1 using correction parameters A to D.

$$x_{1i}'=Ax_{1i}+B$$

$$y_{1i}'=Cy_{1i}+D \quad \text{[Equation 1]}$$

The path correction parameter calculation unit 250 uses the least-squares method to calculate the correction parameters A to D that allow the point sequence $(x_{1i}, y_{1i})$ of the detection path detected by the visual sensor 13 to be as close as possible to the point sequence $(x_{2i}, y_{2i})$ of the low-speed simulation path obtained using the force sensor 14. Note that the following describes calculation for an X component, but the same method applies to calculation for a Y component.

The path correction parameter calculation unit 250 calculates the sum of squares of the path error with respect to the X component in accordance with Equation 2.

$$S = \sum_{i=1}^{n}[x_{1i}' - x_{2i}]^2 = \sum_{i=1}^{n}[Ax_{1i} + B - x_{2i}]^2 \quad \text{[Equation 2]}$$

In order to determine the correction parameters A and B that reduce S represented by Equation 2 to a minimum, the path correction parameter calculation unit 250 solves a system of equations represented by Equation 3, each of which is an equation denoting a partial derivative that results in 0 with respect to a corresponding one of the correction parameters.

$$\begin{cases} \dfrac{\partial S}{\partial A} = \sum_{i=1}^{n}-2[x_{2i} - Ax_{1i} - B]x_{1i} = 0 \\ \dfrac{\partial S}{\partial B} = \sum_{i=1}^{n}-2[x_{2i} - Ax_{1i} - B] = 0 \end{cases} \quad \text{[Equation 3]}$$

Equation 3 may be transformed as represented by Equation 4.

$$\begin{bmatrix} \sum_{i=1}^{n}x_{1i}^2 & \sum_{i=1}^{n}x_{1i} \\ \sum_{i=1}^{n}x_{1i} & n \end{bmatrix} \begin{pmatrix} A \\ B \end{pmatrix} = \begin{pmatrix} \sum_{i=1}^{n}x_{1i}x_{2i} \\ \sum_{i=1}^{n}x_{2i} \end{pmatrix} \quad \text{[Equation 4]}$$

Note here that Equation 4 can be denoted as X·a=y, where a matrix X, a vector a, and a vector y are defined as shown in Equation 5.

$$X = \begin{bmatrix} \sum_{i=1}^{n}x_{1i}^2 & \sum_{i=1}^{n}x_{1i} \\ \sum_{i=1}^{n}x_{1i} & n \end{bmatrix}$$

$$a = \begin{pmatrix} A \\ B \end{pmatrix}$$

$$y = \begin{pmatrix} \sum_{i=1}^{n}x_{1i}x_{2i} \\ \sum_{i=1}^{n}x_{2i} \end{pmatrix} \quad \text{[Equation 5]}$$

Accordingly, the vector a of the correction parameters is represented by Equation 6 using the matrix X and the vector y.

$$a=(X^TX)^{-1}X^Ty \quad \text{[Equation 6]}$$

Both the matrix X and the vector y are known quantities that can be calculated from data of the point sequences of the respective paths, and thus the path correction parameter calculation unit 250 can calculate the correction parameters A and B from Equation 6. The path correction parameter calculation unit 250 can calculate the correction parameters C and D for the Y component in the same manner as described above.

The path correction parameter calculation unit 250 stores the calculated correction parameters A to D in a storage unit (not shown) such as a hard disk drive (HDD) included in the controller 20.

As a result, the deburring device 1 can easily correct for a detection error of the visual sensor 13 in the deburring for another workpiece 30 having the same shape by using the calculated correction parameters A to D to correct for the position of the burr portion of the workpiece 30 detected by the visual sensor 13 and updating the robot program with the thus corrected position of the burr portion.

Although the deburring device 1 needs to run the simulation using the force sensor 14 once at the time of start-up, the deburring device 1 can carry out the simulation and the calculation of the correction parameters automatically, and thus requires no additional user effort.

Deburring Process of Deburring Device 1

Next, an operation related to the deburring process of the deburring device 1 according to the present embodiment will be described.

Figure 5:
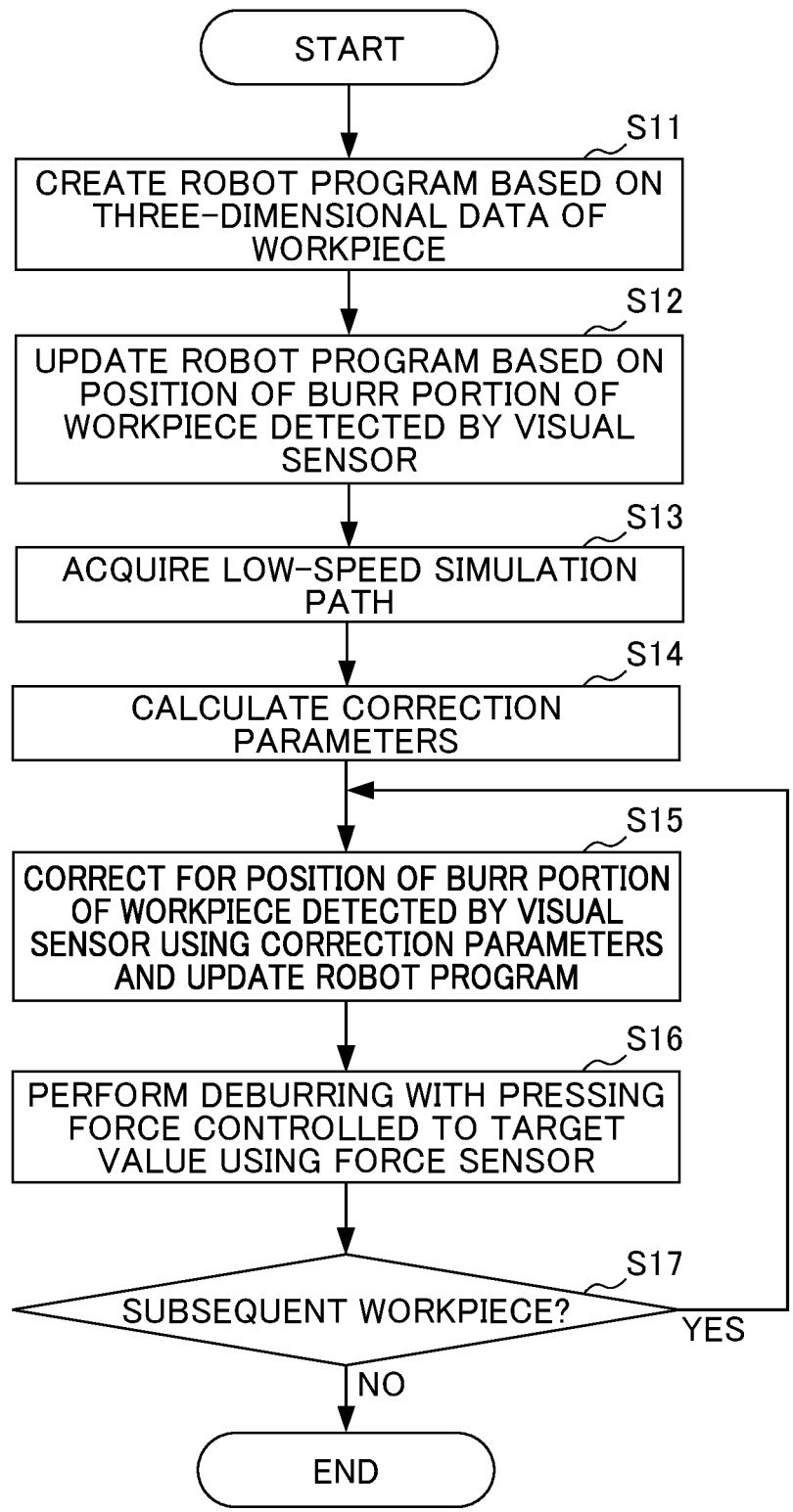
FIG. 5 is a flowchart for describing a deburring process of the deburring device.

FIG. 5 is a flowchart for describing the deburring process of the deburring device 1. The following description is on the assumption that a plurality of workpieces 30 to be subjected to deburring have the same shape.

At Step S11, the robot program creation unit 210 creates a robot program based on three-dimensional data of the workpieces 30 that includes the burr portion shape data acquired from the offline programming device (not shown) and the posture of the tool 15.

At Step S12, the robot program update unit 220 updates the robot program based on the position of the burr portion of a workpiece 30 detected by the visual sensor 13.

At Step S13, the true path acquisition unit 240 acquires the true path of the movement of the tool 15 by running a simulation on the workpiece 30 at low speed while the pressing force detected by the force sensor 14 is controlled to a target value by the force control unit 230 based on the robot program updated at Step S12. That is, the true path acquisition unit 240 acquires the low-speed simulation path.

At Step S14, the path correction parameter calculation unit 250 calculates the correction parameters A to D based on the low-speed simulation path acquired at Step S13, the detection path detected by the visual sensor 13 when the low-speed simulation path is acquired, and Equations 5 and 6.

At Step S15, the robot program update unit 220 corrects for the position of the burr portion of the workpiece 30 detected by the visual sensor 13 using the correction parameters A to D calculated at Step S14 and updates the robot program based on the corrected position of the burr portion.

At Step S16, the control unit 200 causes the force control unit 230 to control the pressing force of the tool 15 to the target value using the force sensor 14 based on the robot program updated at Step S15, and proceeds with the deburring of the workpiece 30.

At Step S17, the control unit 200 determines whether or not there is a subsequent workpiece 30 to be subjected to the deburring. If there is a subsequent workpiece 30, the process returns to Step S15. If there is no subsequent workpiece 30, the deburring process of the deburring device 1 ends.

As described above, the deburring device 1 according to an embodiment acquires the low-speed simulation path by running, before deburring is performed on the workpiece 30, a simulation on the workpiece 30 using the tool 15 at low speed while controlling the pressing force detected by the force sensor 14 to the target value. The deburring device 1 calculates the correction parameters A to D based on the low-speed simulation path and the detection path detected by the visual sensor 13 when the low-speed simulation path is acquired. The deburring device 1 corrects for the position of the burr portion of the workpiece 30 detected by the visual sensor 13 using the correction parameters A to D and updates the robot program based on the corrected position of the burr portion.

Thus, the deburring device 1 can easily correct for a detection error of the visual sensor 13. The deburring device 1 can therefore maintain constant deburring quality even if the visual sensor 13 has a detection error.

In other words, the deburring device 1 can correct for a mechanism error of the robot 10, an error in calibration of the visual sensor 13 and the robot 10 relative to one another, and a detection error of the visual sensor 13, so that the detection path, which is represented by the solid line in FIG. 4, detected by the visual sensor 13 conforms or substantially conforms to the low-speed simulation path, which is represented by the dashed line in FIG. 4, obtained using the force sensor 14.

Although the deburring device 1 needs to run the simulation using the force sensor 14 once at the time of start-up, the deburring device 1 can carry out the simulation and the calculation of the correction parameters automatically, and thus requires no additional user effort.

Although an embodiment has been described above, the deburring device 1 is not limited to the embodiment described above, and encompasses changes such as modifications and improvements to the extent that the object of the present disclosure is achieved.

Modification Example 1

In the embodiment described above, the path correction parameter calculation unit 250 calculates the correction parameters A to D so that the detection path detected by the visual sensor 13 conforms to the low-speed simulation path obtained using the force sensor 14. However, the present disclosure is not limited as such. For example, the path correction parameter calculation unit 250 may calculate correction parameters for correction of mechanism parameters of the robot 10 so that the low-speed simulation path obtained using the force sensor 14 conforms to the detection path detected by the visual sensor 13. Examples of mechanism parameters include zero-degree angle of each joint axis 11 and link length of the robot 10.

Specifically, the path correction parameter calculation unit 250 determines an error $e_j$ represented by Equation 7 by taking k mechanism parameters $q_1$ to $q_k$ to be corrected for, such as zero-degree angle and link length, as unknowns from among all the mechanism parameters (k is an integer equal to or greater than 1, and j is an integer equal to or greater than 2).

$$e_j = P_{1j} - P_{2j} \qquad \text{[Equation 7]}$$

In this equation, represents the jth location in the point sequence of the low-speed simulation path obtained during the simulation at low speed with the force control enabled using the force sensor 14. $P_{2j}$ represents the jth location in the point sequence of the detection path detected by the visual sensor 13. Note that $P_{1j}$ is determined through robot forward kinematics calculation (forward transformation) using the position of each joint axis 11 of the robot 10 during the low-speed simulation and the mechanism parameters $q_1$ to $q_k$, which are unknowns. For the robot forward kinematics calculation (forward transformation), a known method may be employed (see, for example, J. J. Greig, "Robotics—Mechanics, Dynamics, and Control—", "Chapter 3: Manipulator Kinematics", Kyoritsu Shuppan Co., Ltd., 1991, or R. P. Paul, "Robot Manipulators: Mathematics, Programming, and Control", "Chapter 1: Homogeneous Transformations", CORONA PUBLISHING CO., LTD., 1984), and detailed description thereof will be omitted.

The path correction parameter calculation unit 250 calculates the mechanism parameters $q_1$ to $q_k$ that allow Equation 8, which represents the sum of squares of the error $e_j$ represented by Equation 7, to result in a minimum.

$$S = \sum_{j=1}^{n} e_j^2 \qquad \text{[Equation 8]}$$

In order to determine the mechanism parameters $q_1$ to $q_k$ that reduce S represented by Equation 8 to a minimum, the path correction parameter calculation unit 250 solves a system of equations represented by Equation 9, each of which is an equation denoting a partial derivative that results in 0 with respect to a corresponding one of the mechanism parameters as in the case of Equation 4.

$$\begin{cases} \dfrac{\partial S}{\partial q_1} = 0 \\ \dfrac{\partial S}{\partial q_2} = 0 \\ \quad \vdots \\ \dfrac{\partial S}{\partial q_k} = 0 \end{cases} \qquad \text{[Equation 9]}$$

In a case where the system of equations represented by Equation 9 are nonlinear, for example, the path correction parameter calculation unit 250 may determine the mechanism parameters (correction parameters) $q_1$ to $q_k$ through repeated calculation for a smaller error by a known method such as the Newton-Raphson method.

Figure 6:
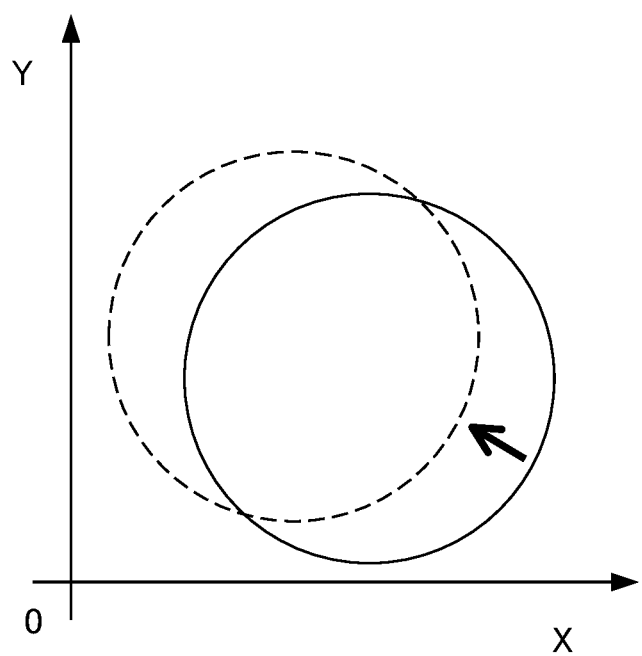
FIG. 6 is a diagram showing an example of a detection path detected by the visual sensor and a low-speed simulation path obtained using a force sensor.

The methods described above enable the deburring device 1 to correct for a mechanism error of the robot 10, an error in calibration of the visual sensor 13 and the robot 10 relative to one another, and a detection error of the visual sensor 13, so that the low-speed simulation path, which is represented by a solid line in FIG. 6, obtained using the force sensor 14 conforms or substantially conforms to the detection path detected by the visual sensor 13.

Thus, the deburring device 1 can easily correct for a detection error of the visual sensor and an error of a mechanical unit of the robot. As a result, the deburring device 1 achieves improved deburring quality, while maintaining a constant pressing force during the deburring using the force sensor 14.

Modification Example 2

In the embodiment described above, for example, the plurality of workpieces 30 have the same shape. However, the present disclosure is not limited as such. For example, the plurality of workpieces 30 may have different shapes. In this case, the deburring device 1 needs to run the low-speed simulation for the correction described above using the force sensor 14 in response to a change in shape of the workpieces 30 under the deburring. However, the deburring device 1 may use existing correction parameters, provided that a change in path between a deburred workpiece and a workpiece to be deburred is small enough. Alternatively, the deburring device 1 may tentatively apply the existing correction parameters once to a similar workpiece and, based on the resulting deburring quality and the value detected by the force sensor 14 during the deburring, determine whether or not it is necessary to recalculate the correction parameters.

Modification Example 3

In the embodiment described above, for example, the path correction parameter calculation unit 250 calculates the correction parameters using one detection path detected by the visual sensor 13 and one low-speed simulation path obtained using the force sensor 14. However, the present disclosure is not limited as such. For example, if a large detection path is detected by the visual sensor 13 and a large low-speed simulation path is obtained using the force sensor 14, the path correction parameter calculation unit 250 may divide the detection path detected by the visual sensor 13 and the low-speed simulation path obtained using the force sensor 14 into a plurality of sections and carry out the correction on a per-section basis.

That is, if a large detection path is detected by the visual sensor 13 and a large low-speed simulation path is obtained using the force sensor 14, the value of a relevant correction parameter can be inconsistent within one path. The path correction parameter calculation unit 250 may therefore calculate a residual S from the correction parameters calculated by the least-squares method, and divide the paths into a plurality of sections if the calculated residual S is greater than a predetermined value. For example, the path correction parameter calculation unit 250 may divide each of circular paths into four equal sections or divide each of long linear paths into a plurality of equal sections. The path correction parameter calculation unit 250 may then calculate the correction parameters on a per-section basis and carry out the correction on a per-section basis.

Modification Example 4

In the embodiment described above, for example, the controller 20 includes all of the robot program creation unit 210, the robot program update unit 220, the force control unit 230, the true path acquisition unit 240, and the path correction parameter calculation unit 250, and controls the robot 10. However, the present disclosure is not limited as such. For example, the controller 20 may only include the robot program creation unit 210, the robot program update unit 220, and the path correction parameter calculation unit 250, and only update the robot program. In this case, an external robot controller (not shown) for controlling the robot 10 may have the force control unit 230 and the true path acquisition unit 240, and the controller 20 may acquire the detection path detected by the visual sensor 13 and the low-speed simulation path obtained using the force sensor 14 from the robot controller (not shown).

Modification Example 5

In the embodiment described above, for example, the deburring device 1 includes the robot 10 and the controller 20. However, for example, the present disclosure may be applied to a control system including the robot 10 and the controller 20, and the robot 10 may be configured to perform machining such as sealing or laser machining. In this case, the visual sensor 13 (burr portion detection unit), the robot program creation unit 210, the robot program update unit 220, the force control unit 230, the true path acquisition unit 240, and the path correction parameter calculation unit 250 of the deburring device 1 may respectively function as a detection unit, a creation unit, an update unit, a control unit, an acquisition unit, and a calculation unit of the control system.

For example, in the case of sealing, a nozzle that discharges a liquid such as a paint may be attached as the tool 15 to the distal end of the robot 10, and the control system may correct for a sealing operation of the robot 10 or correct for mechanism parameters of the robot 10 so that a path error between a path obtained using a position sensor (not shown) of the robot 10 and a detection path detected by the visual sensor 13 detecting a portion actually subjected to the sealing is a minimum. Alternatively, the control system may have an accelerometer or a laser tracker, not shown, attached to the distal end of the robot 10, and acquire a path during the sealing. The control system may correct for the sealing operation of the robot 10 or correct for the mechanism parameters of the robot 10 so that an error between the thus acquired path and the path obtained using the position sensor (not shown) of the robot 10 is a minimum.

For another example, in the case of laser machining, a laser cutter or a welding gun for laser welding may be attached as the tool 15 to the distal end of the robot 10, and the control system may correct for a machining operation of the robot 10 or correct for mechanism parameters of the robot 10 so that a path error between a path obtained using the position sensor (not shown) of the robot 10 and a detection path detected by the visual sensor 13 detecting a portion actually subjected to the machining is a minimum. Alternatively, the control system may have an accelerometer or a laser tracker, not shown, attached to the distal end of the robot 10, and acquire a path during the machining. The control system may correct for the machining operation of the robot 10 or correct for the mechanism parameters of the robot 10 so that an error between the thus acquired path and the path obtained using the position sensor (not shown) of the robot 10 is a minimum.

Thus, the control system can easily correct for a detection error of the visual sensor and an error of a mechanical unit of the robot.

Modification Example 6

In the embodiment described above, for example, the visual sensor 13, the force sensor 14, and the tool 15 are attached to the distal end of the robot 10. However, the present disclosure is not limited as such. For example, the visual sensor 13 may be fixed to a location other than the distal end of the robot 10 where the visual sensor 13 can detect the workpiece 30 and the tool 15.

Each of the functions of the deburring device 1 according to the embodiment described above can be implemented by hardware, software, or a combination thereof. Being implemented by software herein means being implemented through a computer reading and executing a program.

Each of the components of the deburring device 1 can be implemented by hardware including electronic circuitry or the like, software, or a combination thereof.

The program can be supplied to the computer by being stored on any of various types of non-transitory computer readable media. The non-transitory computer readable media include various types of tangible storage media. Examples of non-transitory computer readable media include magnetic storage media (such as flexible disks, magnetic tape, and hard disk drives), magneto-optical storage media (such as magneto-optical disks), compact disc read only memory (CD-ROM), compact disc recordable (CD-R), compact disc rewritable (CD-R/W), and semiconductor memory (such as mask ROM, programmable ROM (PROM), erasable PROM (EPROM), flash ROM, and RAM). Alternatively, the program may be supplied to the computer using any of various types of transitory computer readable media. Examples of transitory computer readable media include electrical signals, optical signals, and electromagnetic waves. Such transitory computer readable media are able to supply the program to the computer through a wireless communication channel or a wired communication channel such as electrical wires or optical fibers.

Note that writing the program to be recorded on a storage medium includes processes that are not necessarily performed chronologically and that may be performed in parallel or individually as well as processes that are performed chronologically according to the order thereof.

To put the foregoing into other words, the deburring device and the control system according to the present disclosure can take various embodiments having the following configurations.

(1) A deburring device 1 according to the present disclosure includes: a deburring robot manipulator configured to remove a burr from an object; a robot program creation unit 210 configured to preliminarily create a robot program for deburring; a burr portion detection unit (visual sensor 13) configured to detect a position of a burr portion of one workpiece 30 using a visual sensor 13, the one workpiece 30 being the object; a robot program update unit 220 configured to update the robot program based on the position of the burr portion of the one workpiece, the position having been detected using the visual sensor 13; a force control unit 230 configured to detect force acting on the robot manipulator and the one workpiece 30, and control the detected force to a predetermined value of pressing force; a true path acquisition unit 240 configured to acquire a true path of a movement of the robot manipulator while the detected force is controlled to the predetermined value of pressing force by the force control unit 230 based on the robot program updated by the robot program update unit 220; and a path correction parameter calculation unit 250 configured to calculate correction parameters related to the position of the burr portion of the one workpiece detected by the burr portion detection unit (visual sensor 13), based on a difference between the true path and a path of a movement of the robot manipulator detected using the visual sensor 13 while the detected force is controlled to the predetermined value of pressing force by the force control unit 230, wherein the robot program update unit 220 further corrects for a position of a burr portion of a subsequent workpiece 30 being the object detected by the burr portion detection unit (visual sensor 13) using the correction parameters calculated by the path correction parameter calculation unit 250 are used to correct, and updates the robot program based on the corrected position of the burr portion, and the force control unit 230 further detects force acting on the robot manipulator and the subsequent workpiece, and controls the detected force to the predetermined value of pressing force based on the robot program updated by the robot program update unit 220.

According to the deburring device 1, it is possible to easily correct for a detection error of the visual sensor and an error of a mechanical unit of the robot.

(2) In the deburring device 1 described in (1), the correction parameters calculated by the path correction parameter calculation unit 250 may be reflected in a result of the detection by the burr portion detection unit using the visual sensor 13.

As a result, the deburring device 1 can accurately correct for a detection error of the visual sensor.

(3) in the deburring device 1 described in (1), the correction parameters calculated by the path correction parameter calculation unit 250 may be reflected in mechanism parameters of the robot manipulator.

As a result, the deburring device 1 can accurately correct for an error of the mechanical unit of the robot.

(4) In the deburring device 1 described in any one of (1) to (3), the path correction parameter calculation unit 250 may calculate, from the calculated correction parameters, a residual S between the true path and the path of the movement of the robot manipulator detected using the visual sensor 13, and if the residual S is greater than a predetermined value, divide the true path and the path of the movement of the robot manipulator detected using the visual sensor 13 into a plurality of sections and calculate the correction parameters on a per-section basis.

As a result, the deburring device 1 can accurately calculate the correction parameters on a per-section basis.

(5) A control system according to the present disclosure includes: a robot 10 configured to machine an object; a creation unit (robot program creation unit 210) configured to preliminarily create an operation program for operation of the robot 10; a detection unit (visual sensor 13) configured to detect one workpiece using a visual sensor 13, the one workpiece being the object; an update unit (robot program update unit 220) configured to update the operation program based on a result of detection of the one workpiece detected by the detection unit; a control unit (force control unit 230) configured to control a machining operation of the robot 10 on the one workpiece based on the operation program updated by the update unit; an acquisition unit (true path acquisition unit 240) configured to acquire a true path of the machining operation of the robot 10 while the machining operation is controlled by the control unit based on the operation program updated by the update unit; and a calculation unit (path correction parameter calculation unit 250) configured to calculate correction parameters related to the result of the detection of the one workpiece detected by the detection unit, based on the true path and a path of the machining operation of the robot 10 detected by the detection unit while the machining operation is controlled by the control unit, wherein the update unit further corrects for a result of detection of a subsequent workpiece being the object detected by the detection unit using the correction parameters calculated by the calculation unit are used to correct, and updates the operation program based on the corrected result of the detection, and the control unit further controls the machining operation of the robot 10 on the subsequent workpiece based on the operation program updated by the update unit.

According to this control system, it is possible to produce the same effect as described in (1).

EXPLANATION OF REFERENCE NUMERALS

1: Deburring device
10: Robot
13: Visual sensor
14: Force sensor
15: Tool
20: Controller
200: Control unit
210: Robot program creation unit
220: Robot program update unit
230: Force control unit
240: True path acquisition unit
250: Path correction parameter calculation unit
30: Workpiece

The invention claimed is:

1. A deburring device comprising:
a deburring robot manipulator configured to remove a burr from an object;
a non-transitory memory configured to store a program; and
a processor configured to execute the program stored on the non-transitory memory to cause the deburring device to:
preliminarily create a robot program for deburring;
detect a position of a burr portion of one workpiece using a visual sensor, the one workpiece being the object;
update the robot program based on the position of the burr portion of the one workpiece, the position having been detected by the visual sensor;
detect force acting on the deburring robot manipulator and the one workpiece, and control the detected force to a predetermined value of pressing force;
acquire a true path of a movement of the deburring robot manipulator based on data outputted by a position sensor while the detected force is controlled to the predetermined value of pressing force based on the updated robot program;
calculate correction parameters related to the position of the burr portion of the one workpiece detected by the visual sensor, based on a difference between the true path and a path of a movement of the deburring robot manipulator detected using the visual sensor while the detected force is controlled to the predetermined value of pressing force;
further correct for a position of a burr portion of a subsequent workpiece being the object detected by the visual sensor using the calculated correction parameters, and update the robot program based on the corrected position of the burr portion; and
further detect force acting on the deburring robot manipulator and the subsequent workpiece, and control the detected force to the predetermined value of pressing force based on the updated robot program.

2. The deburring device according to claim 1, wherein the calculated correction parameters are reflected in a result of the detection using the visual sensor.

3. The deburring device according to claim 1, wherein the calculated correction parameters are reflected in mechanism parameters of the deburring robot manipulator.

4. The deburring device according to claim 1, wherein the processor is further configured to execute the program to further cause the deburring device to:
calculate, from the calculated correction parameters, a residual between the true path and the path of the movement of the deburring robot manipulator detected using the visual sensor, and if the residual is greater than a predetermined value, divide the true path and the path of the movement of the deburring robot manipulator detected using the visual sensor into a plurality of sections and calculate the correction parameters on a per-section basis.

5. A control system comprising:

a robot configured to machine an object;

a non-transitory memory configured to store a program; and a processor configured to execute the program stored on the non-transitory memory to cause the control system to:

preliminarily create an operation program for operation of the robot;

detect one workpiece using a visual sensor, the one workpiece being the object;

update the operation program based on a result of detection of the one workpiece detected by the visual sensor;

control a machining operation of the robot on the one workpiece based on the updated operation program;

acquire a true path of the machining operation of the robot based on data outputted by a position sensor while the machining operation is controlled based on the updated operation program;

calculate correction parameters related to the result of the detection of the one workpiece detected by the visual sensor, based on the true path and a path of the machining operation of the robot detected by the visual sensor while the machining operation is controlled;

further correct for a result of detection of a subsequent workpiece being the object detected by the visual sensor using the calculated correction parameters, and update the operation program based on the corrected result of the detection; and further control the machining operation of the robot on the subsequent workpiece based on the updated operation program.

* * * * *